United States Patent Office 3,171,848
Patented Mar. 2, 1965

3,171,848
PREPARATION OF COMPOUNDS OF METALS OF GROUPS I-A AND II-B
Paul Kobetz, Baton Rouge, La., assignor to Ethyl Corporation, New York, N.Y., a corporation of Virginia
No Drawing. Filed Mar. 29, 1961, Ser. No. 99,663
6 Claims. (Cl. 260—429.9)

The present invention is concerned with a novel process for the production of organometallic compounds, especially alkali metal organo Group II-B compounds.

Methods for preparing certain alkali metal organo Group II-B compounds have long been known. Specifically, sodium triethyl zinc has been prepared by a process involving the reaction of ethyl sodium with diethyl zinc. This procedure suffers from particular inherent disadvantages. By way of example, the ethyl sodium is obtained by the reaction of sodium amalgam with ethyl chloride, thus consuming two moles of the sodium, one in the formation of the product and one in the formation of the by-product sodium chloride. Additionally, ethyl sodium is quite difficult to handle and contaminated with the mercury. Further, the reaction proceeds only with difficulty. Another procedure which has been employed is the reaction of sodium with diethyl mercury. In this method also, the mercury is an undesirable feature and the diethyl mercury is quite difficult to prepare. Accordingly, because of these deficiencies, it is readily apparent that these prior art procedures have not been employed on a commercial scale and thus the industry has been denied these valuable chemical tools which are of considerable utility and would be even more so if made more readily available.

Accordingly, an object of this invention is to provide a new and novel process for the manufacture of alkali metal organo Group II-B metal compounds. A particular object is to provide a novel process for the production of the alkali metal trialkyl Group II-B metal compounds. A still further object is to provide such products in higher yield and purity in a more efficient and economical manner. A specific object of this invention is to provide a unique and effective process for the production of sodium triethyl zinc. Other objects will be apparent as the discussion proceeds.

The above and other objects of the invention are accomplished by the reaction of a complex of an alkali metal hydride and an organo Group II-B metal compound wherein said metal has an atomic number between 30 and 48 inclusive, more appropriately termed an alkali metal organo Group II-B metal hydride, with an olefin. Such complexes wherein the alkali metal hydride is sodium hydride and the organo Group II-B metal compound is a dialkyl zinc compound in the proportions of essentially 1 mole of the former to 2 moles of the latter, particularly the complex sodium diethyl zinc hydride ($NaH \cdot 2ZnEt_2$), are especially preferred. Of the olefins, the alpha-olefins having from 2 to 6 carbon atoms, particularly in a straight chain, have been found most suitable. For best results, the reaction is generally conducted at a temperature between about 60 to 120° C. employing at least one mole of the olefin per mole of hydrogen bonding in the alkali metal organo Group II-B metal hydride complex. Some advantage is also obtained in greater yields and reaction rate by the employment of solvents such as the polyethers, particularly the dimethyl ether of diethylene glycol. If the olefin is normally gaseous under the reaction conditions, appropriate pressure as between about 100 to 500 p.s.i. can be used. Thus, a particular embodiment of the invention comprises the reaction of the complex of sodium hydride with diethyl zinc (sodium diethyl zinc hydride, and especially $NaH \cdot 2ZnEt_2$) with ethylene at a temperature between about 60 to 120° C. in the presence of the dimethyl ether of diethylene glycol to produce sodium triethyl zinc. Generally, in addition to the formation of the alkali metal triorgano Group II-B metal compound, a by-product organo Group II-B metal compound is obtained. This by-product is readily recycled for reaction with additional alkali metal hydride, either in situ or externally, to form the complex starting material. As will be brought out in more detail hereinafter, an alternative procedure can be employed whereby all of the organo Group II-B metal compound is consumed in the formation of the desired alkali metal triorgano Group II-B metal compound. Still further embodiments of the present invention will be brought forth as the discussion proceeds.

The novel process is of particular advantage in that it provides a very effective and simple method for the preparation of alkali metal triorgano Group II-B metal compounds. By way of example, all of the alkali metal employed in the starting material, or in forming the same as the case may be, is consumed only in the production of the desired product without the concomitant formation of by-product metal halides or amalgams. Thus, in essence, these compounds are produced from the basic raw materials of alkali metal, hydrogen, olefin, and organo Group II-B metal compound with all the reagents going toward the formation of the desired products and no undesirable by-products being formed. Accordingly, the raw materials are conserved. Still further, the reaction proceeds quite readily and is adaptable toward formation of many diverse products which have not been obtainable heretofore. For example, it is now possible to produce alkali metal triorgano Group II-B metal compounds wherein the organo groups can be different, e.g. the reaction of sodium diethyl zinc hydride with propylene to produce sodium propyl diethyl zinc. Other advantages of the present invention will be apparent as the discussion proceeds.

In the preferred embodiments of this invention, the complex alkali metal organo Group II-B metal hydride is pre-formed. This reactant is a complex of an alkali metal hydride with an organo Group II-B metal compound of the metals having an atomic number of 30 to 48 inclusive, i.e. zinc or cadmium. Such complexes generally will contain essentially 2 moles of the organo Group II-B metal compound per mole of the alkali metal hydride and can also be referred to as alkali metal organo Group II-B metal hydrides. Thus, typical examples of the alkali metal organo Group II-B metal hydrides include the 2:1 molar complexes of organo zinc compound with alkali metal hydride respectively, such as the complexes of dimethyl zinc with sodium hydride (sodium dimethyl zinc hydride, $NaH \cdot 2Zn(CH_3)_2$); diethyl zinc with sodium hydride (sodium diethyl zinc hydride, $NaH \cdot 2Zn(C_2H_5)_2$); di-n-propyl zinc with sodium hydride (sodium di-n-propyl zinc hydride); di-n-butyl zinc with sodium hydride (sodium di-n-butyl zinc hydride); di-3-heptenyl zinc with sodium hydride (sodium di-3-heptenyl zinc hydride); di-3-hexynyl zinc with sodium hydride (sodium di-3-hexynyl zinc hydride); dicyclohexyl zinc with sodium hydride (sodium dicyclohexyl zinc hydride); dicycloheptyl zinc with sodium hydride (sodium dicycloheptyl zinc hydride); diphenyl zinc with sodium hydride (sodium diphenyl zinc hydride); dibenzyl zinc with sodium hydride (sodium dibenzyl zinc hydride); dinaphthyl zinc with sodium hydride (sodium dinaphthyl zinc hydride); and the like and other such complexes wherein cadmium is substituted for zinc and the other alkali metals as, for example, lithium, potassium, rubidium, or cesium are substituted for sodium. It is to be understood that the hydrocarbon moieties of such complexes can be further substituted with groups which are essentially inert to the reactants or products as, for example, amino groups, the halogens, carbonyl groups, and the like. It is preferred, however, that the organo groups be hydrocarbon. In a particularly preferred embodiment of the invention, the complex alkali metal dialkyl zinc hydrides wherein each alkyl group contains up to and including about 10 carbon atoms are employed since such are more easily obtained, of greater reactivity and the products so produced are of more varied practical utility. Such alkali metal alkyl zinc hydrides wherein the alkali metal is sodium also comprise an especially preferred embodiment because of the greater availability of sodium and economy. It is to be understood that this reactant is employable in the form of its complexes with various complexing organic solvents, especially the Lewis bases such as the polyethers as described hereinafter. The Lewis base complexes are of greater stability as well as greater reactivity than the alkali metal organo Group II–B metal hydrides not so complexed. For example, the dimethyl ether of diethylene glycol is a particularly effective complexing solvent.

The olefin which is employed is in general an organic compound having a double bond between 2 carbon atoms. This double bond, of course, is not the double bond normally referred to in aromatic compounds, such as benzene. The term olefin is intended to denote mono-olefinic, diolefinic, polyolefinic, cycloolefinic, and derivatives thereof which, in general, contain the moiety

in the molecule. Thus, typical examples of such olefinic materials include ethylene, propylene, 2-butene, 1-butene, 1-pentene, 2-pentene, 3-hexene, 4-methyl-1-pentene, 3-methyl-1-butene, the octenes, 1-diisobutylene, trimethylethylene, the decenes, 1-tetradecene, 1-octadecene, cyclic olefins such as cyclopentene, cyclohexene, pinene, substituted olefins such as 1,1-diphenyl ethylene, styrene, vinyl butyl ether, dienes, such as butadiene, and cyclohexadiene and the polyenes such as alloocimene, and the like. In general, such olefins will contain up to about 18 carbon atoms. It is to be understood that they can be further substituted with functional groups which are essentially inert in the reaction system. The hydrocarbon olefinic compounds, especially straight chain olefins, having terminal or alpha-unsaturation are particularly preferred because of their greater availability and reactivity in the process. Such olefins having up to about 6 carbon atoms especially ethylene comprise a particularly preferred embodiment.

The novel process will be more completely understood from a consideration of the following examples wherein all parts are by weight unless otherwise specified.

*Example I*

The 2:1 molar complex of di-n-propylzinc with sodium hydride, sodium di-n-propylzinc hydride

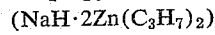

is placed into a reactor equipped with internal agitation, external heating means, and a means for pressurizing with propylene. To the reactor is also added an equal amount by weight of toluene. The reaction mixture is then heated to a temperature of 100° C. maintaining an inert atmosphere, such as nitrogen, and then pressurized to 450 p.s.i.g. with propylene. These conditions are maintained and the propylene pressure sustained by continuous pressurizing with propylene for a period of 2 hours. In this manner, sodium tripropyl zinc suspended in the toluene is obtained in good yield along with essentially an equimolar amount of dipropyl zinc by-product.

When the above example is repeated substituting hexane, octane, nonane, cyclohexane, benzene, and the like solvents for toluene, equally satisfactory results are obtained.

*Example II*

To the reactor employed in Example I was added 45 parts of dimethoxyethane and 11.8 parts of diethyl zinc. Then, 1.2 parts of sodium hydride were added thereto and the mixture heated to reflux temperature and maintained at these conditions for 6 hours. In this manner, a solution of sodium diethyl zinc hydride complex $(NaH \cdot 2Zn(C_2H_5)_2)$, was obtained in essentially quantitative yield. The complex so prepared in the dimethoxyethane, 13.3 parts, was left in the reactor. The reactor was then pressurized with ethylene to 400 p.s.i. and the temperature was increased gradually from 25° C. to 109° C. over a period of 2 hours while maintaining the ethylene pressure in the reactor from 400 to 470 p.s.i.g. during this period. During the course of the reaction, it was found that a pressure drop of 180 p.s.i.g. was obtained and thus an equivalent amount of ethylene was pressurized into the system. This was equivalent to an essentially complete conversion of the sodium diethyl zinc hydride complex to sodium triethyl zinc and diethyl zinc by-product. The product showed no activity toward isopropyl alcohol, but was reactive with water.

*Example III*

The sodium diethyl zinc hydride complex is prepared as in Example II, by reacting 4 parts of sodium hydride with 11.8 parts of diethyl zinc in dimethoxyethane. One-half of the reaction product is placed into a reactor and ethylene bubbled through the mixture at atmospheric pressure with the reaction temperature at 70° for 3 hours. During this period, essentially all of the dimethoxyethane vaporizes from the reactor leaving as the reaction product sodium triethylzinc with a minor amount of diethyl zinc.

*Example IV*

Sodium diethyl zinc hydride was prepared essentially as described in Example II by reacting 2 parts of sodium hydride with 11.8 parts of diethyl zinc in 86 parts of dimethoxyethane at 25° C. for 5 minutes. The reaction mixture was then pressurized with ethylene and the temperature maintained between 25 and 80° C. with the ethylene starting pressure being 510 p.s.i.g. and dropping to 405 p.s.i.g. A portion of the product thus produced was hydrolyzed and the evolved gases collected for analysis by mass spectroscopy. Such analysis showed the gas to comprise essentially 91.5 percent ethane, 7.7 percent ethylene, and 0.8 percent hydrogen illustrating the product to comprise essentially all sodium diethyl zinc and diethyl zinc. Separate analysis of the reaction mixture for sodium and zinc showed a ratio of 1 to 1.3 sodium to zinc respectively whereas sodium triethyl zinc theoretically contains a ratio of 1 to 1 sodium to zinc. Since a 50 percent excess of the NaH was employed in initially forming the sodium hydride complex, the data show that this excess further reacted with the by-product diethyl zinc to form more complex in situ which in turn was ethylated to sodium triethyl zinc. This explains why the ratio of sodium to zinc was not 1 to 2 as would be expected if a 1 to 2 ratio of sodium hydride to diethyl zinc had been originally employed to produce the expected equimolar mixture of sodium triethyl zinc and by-product diethyl zinc. This particular embodiment of the invention is brought out in more detail hereafter. The by-product diethyl zinc can be distilled from the reaction mixture, in this instance along with the ether, for recycle and reuse in the preparation of additional sodium hydride complex starting reagent.

*Example V*

The sodium diethyl zinc hydride complex is prepared similar to the procedure in Example II by reacting 1.3 parts of sodium hydride with 5.9 parts of diethyl zinc in 140 parts of the dimethyl ether of diethylene glycol at 80° C. for 1 hour. The reactor is then pressurized with ethylene to 250 p.s.i. and the pressure maintained constant for 1 hour. In this manner, an essentially quantitative yield of sodium triethyl zinc was obtained with only a minor amount of diethyl zinc by-product because the excess sodium hydride employed continuously formed additional sodium diethyl zinc hydride complex in situ which in turn was olefinated to sodium triethyl zinc.

*Example VI*

The complex is formed by reacting essentially 2 moles of dibutyl zinc with essentially 1 mole of potassium hydride in the presence of the ethyl methyl ether of diethylene glycol at room temperature for 2 hours. The reactor is then pressurized with 1-butene to 100 p.s.i.g. and this pressure maintained for 3 hours. In this manner, potassium tributyl zinc, along with dibutyl zinc by-product, in essentially equimolar amount, is obtained in good yield.

*Example VII*

Lithium tripropyl zinc is produced when reacting the complex obtained by reacting essentially 2 moles of di-n-propyl zinc with 1 mole of lithium hydride with an equivalent amount by weight of the diethyl ether of ethylene glycol at 100° C. for 1 hour with propylene pressurized in the reactor at 100° C. for 1½ hours. Lithium tripropyl zinc, along with the dipropyl zinc by-product, is obtained in good yield in solution in the ether.

When any of the above examples are repeated employing other polyethers as, for example, dimethyl ether of ethylene glycol, dimethyl ether of triethylene glycol, dimethyl ether of tetraethylene glycol, and the like, equally satisfactory results are obtained.

*Example VIII*

The complex sodium di-2-octenylzinc hydride is reacted with essentially an equimolar amount of octene-2 at 100° C. for 3 hours. Sodium 2-octyl dioctenylzinc is produced.

Similar results are obtained when the above example is repeated substituting the corresponding sodium hydride complexes of di-2-butenyl zinc, di-3-hexenyl zinc, dicyclohexenyl zinc, and the like and 2-butene, 3-hexene, and cyclohexene, respectively, for 2-octene.

*Example IX*

Employing the procedure of Example II, a 2:1 molar complex of diphenyl zinc with sodium hydride is obtained by reacting diphenyl zinc with sodium hydride in these molar proportions in the presence of tetrahydropyran at 100° C. for 2 hours. Styrene is then added to the reaction mixture and these conditions maintained for an additional one hour. In this manner, sodium diphenyl-2-phenylethyl zinc is produced.

When the above example is repeated substituting dibenzyl zinc, ditolyl zinc, dixylyl zinc, dinaphthyl zinc, and the like for diphenyl zinc, the corresponding sodium di-aryl-2-phenyl-ethyl zinc compounds are obtained.

*Example X*

Cesium triethyl cadmium is obtained when reacting the 2:1 molar complex of diethyl cadmium and cesium hydride with ethylene at 50° C. for 2 hours.

When the above example is repeated substituting the corresponding complexes of dimethyl cadmium, dipropyl cadmium, dibutyl cadmium, diisoamyl cadmium, diphenyl cadmium, di-4-pentyl cadmium, and the like for diethyl cadmium, the corresponding cesium ethyl diorgano cadmium complexes are obtained.

*Example XI*

Employing the procedure of Example II, dicyclohexyl zinc is substituted for diethyl zinc in the preparation of the complex NaH·2 dicyclohexyl zinc. The resulting complex is maintained at the same conditions and reacted with cyclohexene. In this manner, sodium tricyclohexylzinc and by-product dicyclohexylzinc are obtained.

The above examples are presented by way of illustration and it is not intended that the invention be limited thereto. It will now be evident that other complexes of alkali metal hydrides with organo zinc compounds can be reacted with olefins as described hereinbefore to produce equally satisfactory results.

The temperature at which the reaction is conducted is subject to considerable latitude as between about 0° C. up to the decomposition temperature of the reactants or products, but preferably below 200° C. The reaction is generally quite rapid. However, some advantage is obtained in greater reaction rate and yield per unit time when conducting the reaction at temperatures between 60 to 120° C. Therefore, this temperature range comprises a particularly preferred embodiment.

As indicated by some of the examples, pressure conditions can be quite variable. Ordinarily, atmospheric pressure is employed. However, pressure operation is preferably employed when the olefin is gaseous under reaction conditions. In general, pressures above atmospheric are all that are required for good operation. However, it is preferable to employ pressures between about 100 to 5000, usually below 500, p.s.i. when the olefin is gaseous and to maintain volatile reactants in the liquid phase.

The length of reaction time likewise is not critical since the reaction is generally quite rapid. Ordinarily reaction times less than about 10 hours are quite adequate and preferably are maintained between about ½ to 5 hours. Longer reaction times than 5 hours are to be avoided particularly at high temperatures since some degradation of the product may occur.

The proportions of the reactants, i.e., the olefin and the alkali metal organo Group II-B metal hydride complex, are not critical. However, in order to obtain the proper stoichiometry, at least one mole of the olefin is employed per mole of the complex, so that all of the hydrogen originating from the metal hydride is olefinated. Excesses can be employed to further enhance the yield and drive the reaction to completion since such excesses are readily recoverable for reuse. Ordinarily, however, excesses above about 10 mole percent are not employed for practical results.

While a reaction diluent need not be employed, some advantage is achieved when the reaction is conducted in the further presence of a liquid organic diluent. Such diluents are preferably essentially inert in the reaction with exception that those that will complex with the product or reactants can be employed since they will not hinder the desired result. Further criteria of such solvents are that they be liquid under the reaction conditions and preferably readily recoverable from the reaction system. Among the solvents which can be employed are included, for example, the hydrocarbons, ethers and amines. Among the hydrocarbons which can be employed are included the various alkanes, alkenes, cyclanes, cyclenes and aromatic compounds, including the mononuclear aromatic compounds, polynuclear non-fused ring and polynuclear fused ring aromatic compounds. When alkenes or cyclenes are employed as reactants an excess thereof can be used as diluent particularly in those instances wherein they are liquid under the condition of reaction. Typical examples of the alkanes which are are employed include heptane, octane, nonane, up to and including about octadecane and the like, and their various branched chain isomers. Among the alkenes are included, for example, heptylene, octylene, and the like, up to and including about octadecylene and their various branched chain isomers. When the cyclanes are employed as diluents, they can be, for example, cycloheptane, cyclooctane, methylcyclohexane, dimethylcyclohexane, isopropylcyclopentane, and the like. Typical examples of the cyclenes include cycloheptene, cyclooctene, 1-isopropylcyclopentene-1, 1-methylcyclohexene-1, and the like. Similarly, various polycyclanes and cyclenes are employed as for example, cyclopentylcyclopentane; (2 - methylcyclopentyl) - cyclohexane; cyclohexylcyclohexane; decahydronaphthalene; 1,1'-dicyclopentenyl; 2,2'-dicyclohexenyl; O,4,4 - bicyclodecene-1; decahydrofluorene; and the like. Typical examples of mononuclear aromatic compounds include toluene, ethylbenzene, the xylenes, 1,2-diethylbenzene, cyclopropylbenzene, the cymenes, and the like. When the diluents are polynuclear non-fused aromatic compounds, they can be, for example, 1 - methyl - 2 - phenylbenzene; 1,3 - diphenylpropane; 1-phenyl-2-p-tolylethane; 1,1-diphenylheptane; and the like. When polynuclear fused ring aromatic compounds are employed they can be, for example, indane; 1-methylindane; indene; tetralin; 1,2-dihydronaphthalene; 1-methylnaphthalene; and the like. Generally speaking, the ethers can be non-aromatic, aromatic, and polyethers. The non-aromatic ethers include the monoaliphatic and mixed ethers. Typical examples of the monoaliphatic ethers which are employed are di-n-butyl ether; di-sec-butyl ether; diisobutyl ether; di-n-amyl ether; di-n-heptyl ether; and the like saturated and unsaturated ethers. Examples of the mixed ethers which are employed are n-amylmethyl ether; tert-amylethyl ether; n-butylisopropyl ether; ethylisoamyl ether; n-butyl-n-propyl ether; and the like. The aromatic ethers include, for example, the mono aromatic ethers, alkyl aryl ethers, and the alkaryl alkyl ethers. Typical examples of the mono aromatic ethers include dibenzyl ether; diphenyl ether; and the like. When the aromatic ether is an alkyl aryl ether, one can employ, for example, methylphenyl ether; methyl-o, m, or p-tolyl ether; methyl-α-naphthyl ether; ethylphenyl ether; ethyl-o, m, or p-tolyl ether; ethyl-α-naphthyl ether; phenyl-n-propyl ether; isopropylphenyl ether; n-butylphenyl ether; n-butyl-o-tolyl ether; isoamyl-n-naphthyl ether; and the like. Cyclic ethers are also employable as, for example, tetrahydrofuran, tetrahydropyean, and the like. The alkaryl alkyl ethers which are employed can be, for example, benzylmethyl ether; benzyl ethyl ether; benzyl-n-butyl ether; and the like. Examples of the polyethers which are employed are those having the configuration R—O—(CH$_2$)$_n$—O—R wherein R is an organic radical, preferably hydrocarbon or ether radicals having up to about 4 carbon atoms each, and $n$ is a small whole number as between about 1 to 10, preferably 1 to 3 inclusive. For example, such polyethers include ethylene glycol ethyl methyl ether; the diethyl ether of ethylene glycol, methyl-n-propyl ether of ethylene glycol; 1,4-dioxane; tetraethylene glycol dimethyl ether; glycerol trimethyl ether; dimethyl ether of diethylene glycol; dimethoxyethane, diethyl ether of diethylene glycol; and the like. Other polyethers which can be employed include, for example, pyrocatechol dimethyl ether, resorcinol dimethyl ether; 1,2,4-trimethoxybenzene, and the like. Included among the amines are the primary, secondary, tertiary and heterocyclic amines as for example ethyl amine, propyl amine, diethyl amine, dipropyl amine, dicyclohexyl amine, diphenyl amine, triphenyl amine, triethyl amine, myristyl diethyl amine, pyridine, cyclohexylamine, ethanolamine, dimethylaniline, ethylenediamine, quinuclidine, aniline, tribenzyl amine, trivinyl amine, and the like. In general the hydrocarbon portions of such diluents will have up to about 20 carbon atoms. Such solvents can of course contain other substituents which are essentially non-reactive in the system and will not hinder the principal reaction desired. The ethers comprise especially preferred reaction media, particularly the polyethers, since higher yields are obtained when such are employed. Likewise the ethers more readily complex with metal organo Group II–B compounds providing novel products which are in solution and more readily adaptable to further use than the uncomplexed metal organo Group II–B compounds. Of the ethers the dialkyl ethers of ethylene and diethylene glycol wherein the alkyl groups contain up to about 6 carbon atoms are particularly preferred. Among such ethers the dimethyl ether of diethylene glycol and the dimethyl ether of ethylene glycol are particularly advantageous.

While the above discussion has been confined to the hydrocarbons, ethers, and amines with the ethers being preferred, other solvents are employable such as the Lewis bases which are essentially inert in the reaction mixture in the sense that they do not degrade the reactants or products. Such Lewis bases of the type described by Noller in "Chemistry of Organic Compounds," W. B. Saunders Co., 1951, at page 234, and the article by Stone in "Chemical Review," vol. 58, 1958, at page 101 can be employed.

The proportion of solvent which is employed is subject to considerable latitude. In general, between about 1 to 100 parts per part by weight of the metal organo Group II–B hydride compound are employed. In those instances wherein a complex of the solvent with the product is achieved the solvent is used in amount at least sufficient to obtain one molecule of the solvent complexed with one molecule of the metal organo Group II–B product.

It is not necessary to recover the product from the reaction system, since it can be employed as obtained. However, if it is desired to so purify the product, such can be readily accomplished by distillation of the solvent from the system and either simultaneous or subsequent distillation of the by-product diorgano Group II–B metal compound or the reverse sequence, depending on which is the lower boiling leaving, depending upon the solvent employed in the initial reaction, the complexed or uncomplexed alkali metal triorgano Group II–B metal compound. Additionally, when the alkali metal triorgano Group II–B metal compound formed is solid or insoluble in the reaction system, it can be readily recovered by filtration. Other general recovery techniques are equally applicable.

The above discussion has described a particular mode of processing of the present invention wherein the alkali metal organo Group II–B metal hydride complex is pre-formed prior to reaction with the olefin and upon reaction with the olefin, in general, equimolar amounts of the corresponding alkali metal triorgano Group II–B metal compound and diorgano Group II–B by-product is obtained depending upon the initial quantity of alkali hydride used. The processing can be modified in order to produce, as the sole product, the alkali metal triorgano Group II–B metal compound. Thus, another embodiment of the invention comprises the use of the alkali metal organo Group II–B hydride complex in admixture with an essentially equimolar amount of, preferably, the same alkali metal hydride as contained in the aforementioned complex and adding additional alkali metal hydride, if desired, in incremental amounts to consume the by-product diorgano Group II–B compound as formed. The processing is then conducted in the same manner as described above with regard to the temperature, pressure, olefins, solvents (especially the Lewis bases such as the polyethers and cyclic ethers), and proportions of the two principal reactants. This embodiment of the invention has the particular advantage of providing the alkali metal triorganozinc compound essentially pure, thus eliminating any recovery operations or separation of the by-product diorgano Group II–B metal compound from the reaction mixture. The following example will illustrate this particular embodiment of the invention.

*Example XII*

The procedure of Example II is repeated essentially as described with exception that at the completion of the formation of the sodium diethyl zinc hydride complex, ($NaH \cdot 2Zn(C_2H_5)_2$), an equimolar amount of sodium hydride (1.2 parts) is added to the reactor and then the system pressurized with ethylene as described at the same temperature and pressure conditions. Sodium hydride is then incrementally added in amount sufficient to consume essentially all the diethyl zinc by-product as it forms. In this manner, sodium triethyl zinc is produced in essentially quantitative yield with minimal by-product formation of dimethyl zinc.

This embodiment of the invention is also illustrated in Examples III through V above.

Similar results are obtained when the Examples I and VI through XI and others are repeated incorporating, after formation of the alkali metal organo Group II–B hydride complex, essentially an equimolar amount of the respective alkali metal hydrides in the reaction mixtures, adding incremental amounts of alkali hydride if desired during the course of the reaction, and reacting with the respective olefins, as described, in amounts at least equivalent to the hydrogen content of the alkali metal organo Group II–B hydride complex and the added alkali metal hydride. Additional examples of this embodiment of the invention will now be evident.

In another embodiment of the invention, an initial in situ formation of the complex alkali metal organo Group II–B hydride complex is employed. That is, rather than pre-forming the alkali metal hydride, this material is obtained simultaneous with reaction of the olefin. Such an operation is also preferably conducted in the presence of the Lewis bases, especially a polyether or cyclic ether of the type described hereinbefore. Likewise, the temperature, pressure, solvent, and stoichiometric variables equally apply along with the incremental addition of the alkali metal hydride if desired to consume essentially all of the by-product diorgano Group II–B compound as formed. This embodiment has the advantage of minimization of handling of materials as well as the factor that lesser times of reaction for production of a given quantity of alkali metal triorgano zinc compound are required than would be expected from the cumulative times required in the steps of pre-forming the alkali metal organo Group II–B metal hydride and then reacting the latter separately with the olefin. The following example will illustrate this particular embodiment of the invention.

*Example XIII*

Example IV is repeated essentially as described with exception that the sodium hydride, diethyl zinc, and dimethoxyethane are all added to the reactor simultaneously and the reactor pressurized with ethylene to about 500 p.s.i.g. while maintaining the temperature between 25 to 80° C. and incrementally adding sodium hydride to consume the by-product diethyl zinc as it forms for a period of 2 hours. In this manner, sodium triethyl zinc in essentially quantitative yield is obtained.

When the above run is repeated with exception that the diethyl zinc and sodium hydride are employed in an essentially 2:1 molar ratio respectively and no incremental sodium hydride is added, sodium triethyl zinc and diethyl zinc in essentially equimolar amounts are obtained.

When any of the above Examples I through III and V through XII are repeated employing the procedure of Exaxmple XIII of simultaneous reaction of the alkali metal hydride, diorgano Group II–B metal compound, and olefin at the conditions used therein for the olefination, equally good results are obtained.

A still further and alternative embodiment of this invention, which is of advantage in many cases, comprises the formation of the alkali metal organo Group II–B metal hydride complex as discussed hereinbefore and illustrated by the Examples I through XI, then separating by conventional techniques such as distillation, of the by-product diorgano Group II–B metal compound from the reaction mixture for recycling to reacting with additional alkali metal hydride, preferably in the presence of a Lewis base, especially a polyether or cyclic ether. In this embodiment of the invention, the conditions of temperature, pressure, solvents, and stoichiometry, described hereinbefore with regard to the hydride complex forming steps and olefination steps are equally applicable.

This embodiment of the invention is illustrated by the following example.

*Example XIV*

Example II is repeated essentially as described with exception that at completion of the reaction with ethylene, the reaction mixture is then subjected to a vacuum at about 80° C. to remove the dimethoxyethane and by-product diethyl zinc which are transmitted to a second reactor employed in forming the sodium diethyl zinc hydride complex, leaving the sodium triethyl zinc essentially pure in the first reactor. To the second reactor is added essentially ½ mole of sodium hydride per mole of the diethyl zinc recovered from the preceding reaction. With the reactor at 80° C. for 1 hour, the complex sodium diethyl zinc hydride, ($NaH \cdot 2Zn(C_2H_5)_2$), is produced which is then reacted with ethylene as described in Example II.

When the procedure of the above example is employed in any of the Examples I and V through XI, equally satisfactory recycling of by-product diethyl zinc is obtained.

In view of the above discussion, it will now be evident that other modifications of the processing are possible and it is not intended to be limited by the particular examples presented herein. The processing can be accomplished in batch systems or on a continuous basis by appropriate processing equipment.

As indicated herein, the principal products produced according to the novel processing of this invention are the alkali metal triorgano Group II–B metal compounds and the diorgano Group II–B metal compounds. The alkali metal triorgano Group II–B metal compounds are of considerable utility. By way of example, sodium triethyl zinc is well suited as an electrolyte for the production of various other organometallic compounds by the use of an appropriate metal anode. In particular, tetraethyllead is obtained by the electrolysis of sodium triethyl zinc at a temperature above its melting point with an applied voltage of about 10 volts or higher and a current density of between about 0.01 to 0.25 amp./cm.². A still further use of the alkali metal triorgano Group II–B metal compound is an intermediate in the formation of other products, especially other organometallics by their reaction with various metal salts. By way of example, when lead chloride, acetate, or sulfate are reacted with sodium triethyl zinc at temperatures preferably between about 25 to 100° C. in the presence of suitable solvents, if desired, tetraethyllead is obtained in good yield. Other alkali metal organo Group II–B metal compounds produced according to the process of this invention are equally employable for these purposes. Likewise, the diorgano Group II–B metal compounds produced as by-products in certain embodiments of this invention are comparatively well known and of well known utility in addition to their use in the formation of the alkali metal triorgano Group II–B metal compounds as described herein. By way of example, diethyl zinc can likewise be reacted with metal salts, such as lead chloride, to produce the corresponding organo-metallic compounds, e.g. tetraethyllead. These by-products are also useful in the formulation of catalysts, particularly their reaction with refractory metal halides, such as titanium tetrachloride, for the polymerization of olefins such as ethylene, at suitable temperatures and pressures to produce high melting polymeric materials. Other uses for the products obtained according to the processing of this invention will now be evident.

Having thus described the novel process, it is not intended that it be limited except as set forth in the following claims.

I claim:

1. A process for the manufacture of alkali metal hydrocarbon Group II–B compounds which comprises reacting a 1:2 molar complex, respectively, of an alkali metal hydride and a hydrocarbon Group II–B metal compound, wherein said metal has an atomic number between 30 and 48, inclusive, with an unsaturated straight-chain hydrocarbon containing only olefinic unsaturation and having up to about 18 carbon atoms therein, at a temperature in the range of from about 20° to about 180° C., sufficient to effect said reaction but insufficient to effect decomposition of the reactants and the product.

2. A process for the manufacture of an alkali metal trihydrocarbon Group II–B metal compound which comprises reacting the 1:2 molar complex of an alkali metal hydride with a dihydrocarbon Group II–B metal compound, respectively, wherein said metal has an atomic number between 30 and 48, inclusive, with an unsaturated straight-chain hydrocarbon containing only olefinic unsaturation and having up to about 18 carbon atoms therein, at a temperature in the range of from about 20° to about 180° C., sufficient to effect said reaction but insufficient to effect decomposition of the reactants and the product.

3. A process for the manufacture of an alkali metal trialkyl zinc compound which comprises reacting a 1:2 molar complex, respectively, of an alkali metal hydride and a dialkyl zinc compound with an unsaturated straight-chain hydrocarbon containing only olefinic unsaturation and having from 2 to about 6 carbon atoms therein at a temperature between about 60 and about 120° C. sufficient to effect said reaction but insufficient to effect decomposition of the reactants and the product.

4. The process of claim 3 wherein the reaction mixture also has incorporated therein, as a reactant, an essentially equimolar amount of alkali metal hydride per mole of said complex.

5. A process for the manufacture of sodium triethyl zinc which comprises reacting the 1:2 molar complex, respectively, of sodium hydride and diethyl zinc with ethylene at a temperature between about 60° and about 120° C., sufficient to effect said reaction but insufficient to effect decomposition of the reactants and the product, in the presence of the dimethyl ether of diethylene glycol.

6. A process for the manufacture of sodium triethyl zinc which comprises reacting the 1:2 molar complex of sodium hydride and diethyl zinc, respectively, with ethylene in the presence of dimethoxyethane at a temperature between about 60° and about 120° C. sufficient to effect said reaction but insufficient to effect decomposition of the reactants and the product.

References Cited by the Examiner

UNITED STATES PATENTS

| 2,786,860 | 3/57 | Ziegler et al. | 260—448 |
| 2,989,557 | 6/61 | Blitzer et al. | 260—429.9 |
| 3,057,897 | 10/62 | Robinson | 260—437 |

FOREIGN PATENTS 548,184  9/56  Italy.

OTHER REFERENCES

Coates: "Organo-Metallic Compounds" (1960), pages 23 and 69.

Hurd: J. Organic Chemistry, vol. 13 (1948), pages 711–713.

Rochow: "The Chemistry of the Organometallic Compounds" (1957), pages 60, 61, 103 and 104.

TOBIAS E. LEVOW, *Primary Examiner.*

DANIEL D. HORWITZ, *Examiner.*